T. RIGBY.
TREATMENT OF PEAT.
APPLICATION FILED MAY 7, 1914.

1,251,285.

Patented Dec. 25, 1917.
3 SHEETS—SHEET 1.

Inventor:—
Thomas Rigby

T. RIGBY.
TREATMENT OF PEAT.
APPLICATION FILED MAY 7, 1914.
1,251,285.
Patented Dec. 25, 1917.
3 SHEETS—SHEET 2.
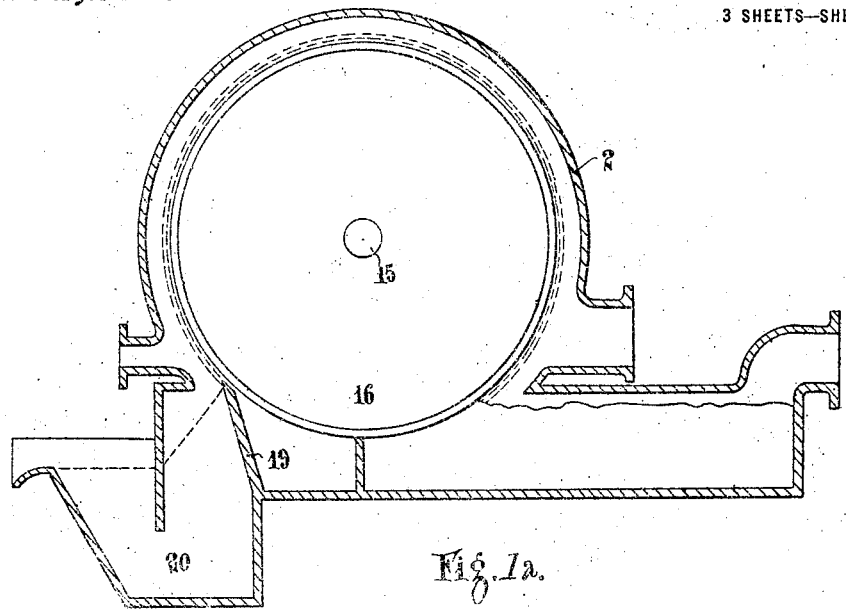
Fig. 1a.
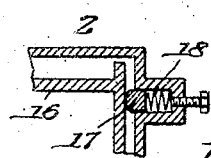
Fig. 1c.
Fig. 1b.
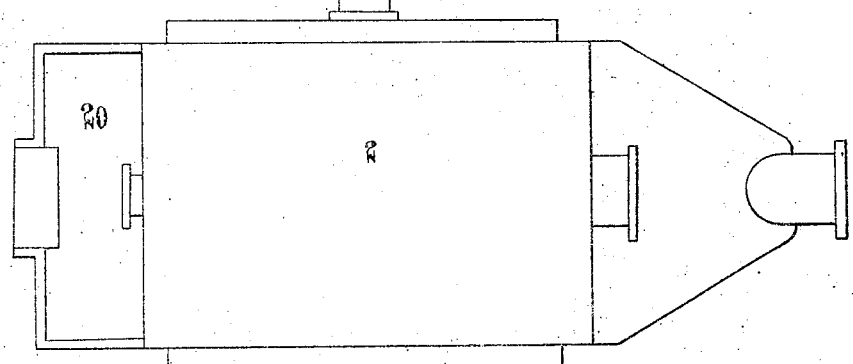

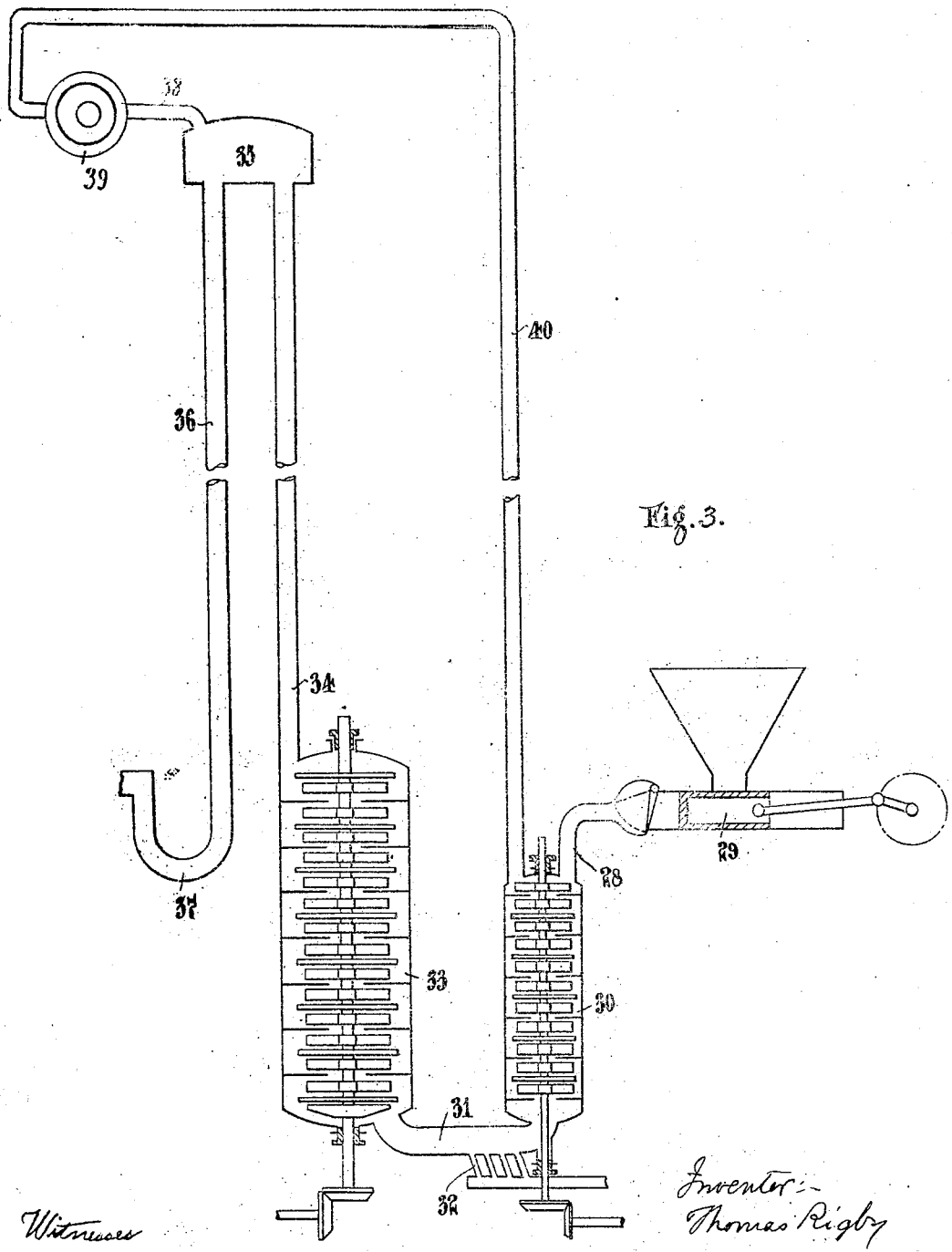

UNITED STATES PATENT OFFICE.

THOMAS RIGBY, OF DUMFRIES, SCOTLAND, ASSIGNOR TO WETCARBONIZING LIMITED, OF LONDON, ENGLAND.

TREATMENT OF PEAT.

1,251,285.  Specification of Letters Patent.  Patented Dec. 25, 1917.

Application filed May 7, 1914. Serial No. 837,064.

*To all whom it may concern:*

Be it known that I, THOMAS RIGBY, a subject of the King of Great Britain and Ireland, and residing at 61 Loreburn street, Dumfries, Scotland, have invented certain new and useful Improvements in and Relating to the Treatment of Peat, of which the following is a specification.

This invention relates to the treatment of peat by processes having for their object the removal with greater ease of associated liquid matter therefrom, such removal being secured under the influence of heat with or without other agency. It has particular reference to those cases where the nature of the peat or the treatment adopted, or both, is such that the reaction is brought about at lower temperatures than usual for instance not far, if at all, above 100° C., and even in some instances appreciably below this temperature.

The particular object of the invention is to effect savings in the heat consumption of the process.

According to this invention when effecting heat treatment of peat transfer of heat from hot treated wet peat or from hot liquid removed therefrom is effected by condensing water vapor obtained from one or both of the former in such manner as to yield heat to raw peat awaiting treatment, this being preferably effected by uninterruptedly transferring heat in this manner from a continuously flowing mass of the treated material to one of raw material, said water vapor being carried from one material to the other by a circulating current of moisture-carrying gas or being generated by release of pressure or production of a partial vacuum, or in other similar manner.

In order to effect further economies according to the present invention, moisture-laden gases resulting from the drying of the treated peat, for example, (see British Patent No. 24748 of 1911), or cooling water from gas cooling operations in by-product gasifying plant or both are employed to yield up heat for heating raw peat awaiting treatment.

The accompanying drawings show diagrammatically various forms of apparatus for carrying the present invention into effect, there being shown in—

Figure 1:
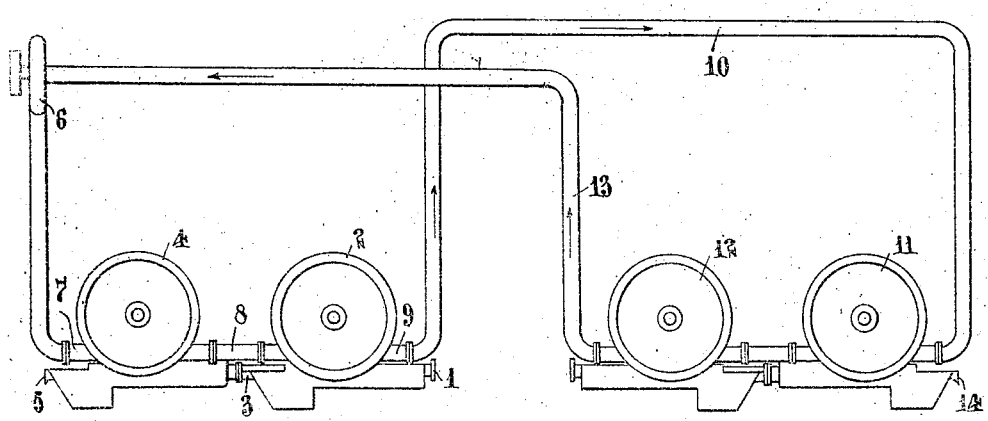
Figure 2:
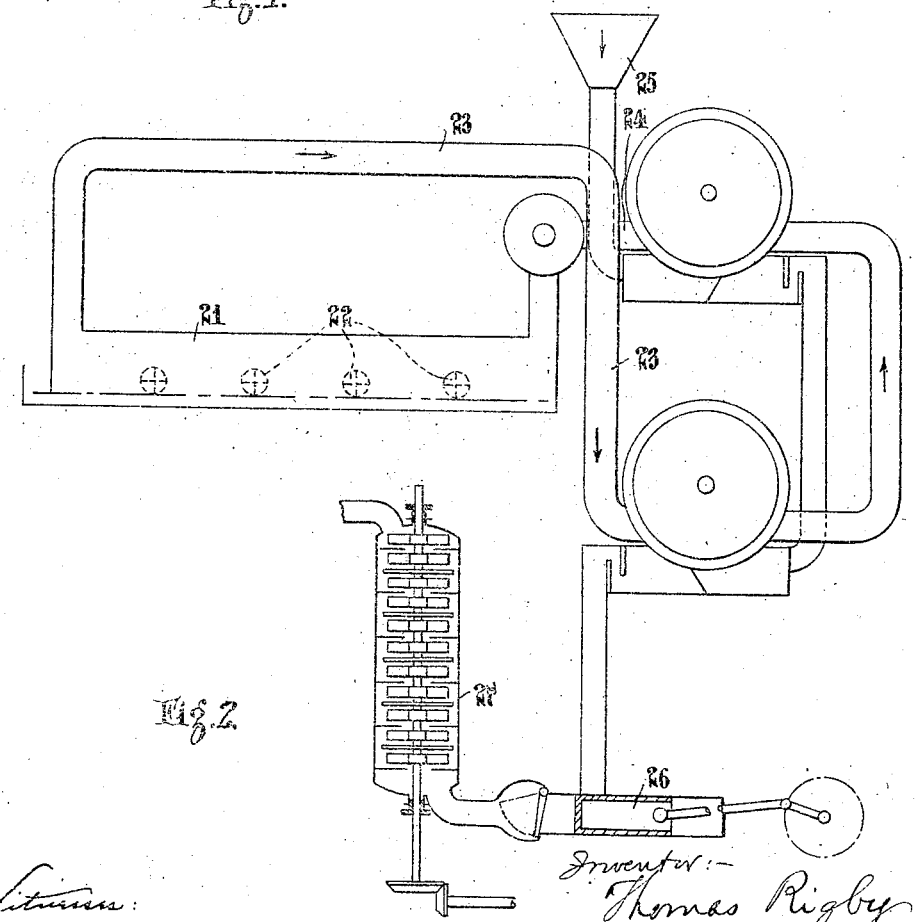

Figure 1 an apparatus for effecting recuperation of heat by gas circulated between treated and untreated material, Figs. 1ª, 1ᵇ, and 1ᶜ showing details thereof; in Fig. 2 an elevation of a modification in which a regeneration is effected by circulating gas between hot press effluent and raw peat; and in Fig. 3 a form in which recuperation is effected by vaporizing water from hot treated peat by reduction of superincumbent pressure and introduction of this vapor into the raw peat.

The method about to be described is particularly applicable where only a low maximum working temperature is maintained in the heat treatment process as a consequence of entirely or partially avoiding the pulping and destruction of the fibers usually resorted to and where as a further consequence of the conditions required in continuous working it becomes important that the handling shall be of such a character as at most to involve mixing and not disintegration to any substantial extent. The method is, however, also applicable to those other cases of heat treatment where the maximum temperature to be reached is not a high one or even in the latter case if it be combined with regeneration methods such as have been previously proposed or are hereinafter discussed, having for their result to reduce the material in an economical manner to a temperature approaching that at which filtration can be undertaken. It constitutes a companion to application Serial Number 180,643, filed July 14, 1917, which has been divided therefrom.

In the form shown in Figs. 1, 1ª and 1ᵇ transfer of heat from hot to cool material is effected by a circulating current of gas, for instance air, which may be only in part returned after parting with its heat, or may be very largely if not wholly replaced by fresh quantities liberated from the peat by the heating which it undergoes.

The hot peat which has undergone heat treatment in a stage where evaporation is prevented enters at 1 into a casing 2, within which a drum slowly rotates, carrying the peat over with it to the far side of the casing whence it is discharged at 3, passing to a similar device 4, which it leaves at 5. A current of gas from the fan 6, however, enters the casing 4 at 7, sweeping over the hot peat upon the drum, cools it by taking up moisture, and then passes by the pipe 8 to the second casing 2 (wherein the operation is repeated) and which casing it leaves at the point 9. In this way, peat is by passing through the casings 2 and 4 cooled to the desired degree before filtration, while the gas current becomes more or less saturated with water vapor at an elevated temperature, and passes by the pipe 10 to the devices 11 and 12, in which the converse operation takes place, the gas giving up its heat by condensation of its water vapor in the peat, and returning to the fan by the pipe 13, while the peat leaves the apparatus at the point 14, when its heat treatment under conditions preventing evaporation can be completed as is deemed most expedient. It will be understood that numbers of heating and cooling elements employed may be varied according to the circumstances. In Figs. 1$^a$ and 1$^b$, which show one of these devices in greater detail in sectional elevation and in plan respectively, is indicated the casing 2, within which revolves with the shaft 15 the drum 16, the necessary seal against loss of vacuum or pressure, according to circumstances being insured by a packing ring 17 under influence of springs 18 (see Fig. 1$^c$). A wall 19 prevents direct flow through the apparatus, and an appropriate liquid seal, indicated by way of example at 20, is also provided.

In some instances, instead of or in addition to the method last described, the heat may be obtained by passing the gas current into contact with hot effluent for which purpose instead of a device of the character last described, a gas washer of more or less ordinary character may be employed.

Thus, in Fig. 2 is shown a washer 21 through which hot effluent flows, and in which it is dispersed by paddles 22, the gas current flowing in a contrary direction, and passing by the pipe 23 to a pair of devices of the character already described, which are arranged in series, the gas current (which eventually returns by the pipe 24 to the washer) heating raw peat entering at 25, and passing from the heaters to a plunger feeding device 26, and thence to the vessel 27, from which after heat treatment under conditions preventing evaporation the peat finally passes to the presses.

Such a manner of effecting the regeneration is useful where the heat of cooling water from gas cooling plant of by-product recovery or other gasifiers is available and it forms a more economical way of recovering heat than the present practice of employing the heated cooling water to saturate as far as possible the blast for the gas producer which is often objectionable owing to the limited temperature of the large volume of cooling water and the small quantity of air required for the producer. If hot peat effluent be available at a relatively high temperature, say near 100° C., and be employed for saturation of the blast, it becomes possible to obtain much higher temperatures, so that in certain circumstances the need for additional steam may be quite eliminated. Thus by using gas cooling water for heating peat, and peat effluent for saturating the blast, substantial over-all economies become possible. Again, where the later stages of the drying of the peat are effected by heating in direct contact with gases (see for instance British Patents Nos. 17610 and 24748 of 1911, also 17426 of 1912) these gases leave the system in a water-laden condition, and at a fairly elevated temperature. These gases can with advantage be caused to impart heat to the peat in the heat treatment process, as for example by passing them to a heating device or series thereof, in which they are brought into contact with the material to be heated. It is desirable for economical transfer of heat that the gases should be near their saturation temperature, for which purpose if the washing which they are usually subjected to for removal of residual peat dust has not already done so sufficiently, they may be suitably water or air cooled.

Where in the heat treatment according to any of the methods indicated regeneration of heat from a material at a temperature above the atmospheric boiling point is desired, this may in certain cases with advantage be effected by releasing the pressure in one or a number of stages, and then recovering the heat of this steam by admixture of the same with cooler material, or by surface heating in appropriate heat exchanging devices. Such a principle can be extended to the recovery of the heat of a material below the normal boiling point by subjecting the material to reduced pressure and collecting the vapor and any fixed gases so evolved, and employing the same in any one or other of the ways already indicated for heating cooler material, the energy consumption in the production of the partial vacuum and other energy losses to a large extent reappearing as heat in the evacuated products and being thus economized.

Such an arrangement is indicated in Fig. 3, in which peat introduced into the pipe 28 by the feeding device 29 enters a mixer, 30, the equivalent of the vessel 27 (Fig. 2) passing thence through the pipe 31 provided with steam nozzles 32 to the vessel 33, wherein the heat treatment under conditions preventing evaporation is completed. The peat is forced from this vessel by the feeding device through a pipe 34, connected to a vessel 35, also provided with a pipe 36 sealed at its base by a bend 37, the pipes 34 and 36 being of such length as to act as barometric seals. The vessel 35 has a pipe 38 connected to a turbine exhauster 39, evacuating the vessel 35, and introducing the vapor so generated into the continuously flowing stream of peat by the pipe 40.

Having now described my invention, what I claim as new and desire to secure by Letters Patent is:—

1. A method of economizing heat in the treatment of peat effected by raising its temperature under pressure sufficient to prevent evaporation, consisting in transmitting heat from the product of the treatment to the untreated material by the intermediary of heat carrying matter which circulates between and comes directly into contact with both the heat rejecting product of the treatment and the heat absorbing untreated material.

2. A method of economizing heat in the treatment of peat effected by raising its temperature under pressure sufficient to prevent evaporation, consisting in circulating a current of gaseous matter such as air so that it comes in direct contact with the hot products of the treatment to extract heat therefrom and also in direct contact with the cooler peat about to be treated to impart heat thereto.

3. A method of economizing heat in the treatment of peat effected by raising its temperature under pressure sufficient to prevent evaporation, consisting in extracting heat from the product of the treatment by means of a circulating body of heat carrying matter, extracting a further quantity of heat of lower degree from liquid expressed from the treated material by means of a circulating body of heat carrying matter and imparting at separate stages to the material about to be treated the heat thus extracted.

4. A method of economizing heat in the treatment of peat effected by raising its temperature under pressure sufficient to prevent evaporation, consisting in extracting heat from the product of the treatment by means of vapor generated upon a reduction of pressure, extracting a further quantity of heat of lower degree from said product by means of a circulating body of heat carrying matter such as air brought in direct contact therewith and imparting at separate stages to the material about to be treated the heat thus extracted.

5. A method of economizing heat in the treatment of peat effected by raising its temperature under pressure sufficient to prevent evaporation, consisting in extracting heat from the product of the treatment by means of vapor generated upon a reduction of pressure, extracting a further quantity of heat of lower degree from liquid expressed from the treated material by means of a circulating body of heat carrying matter such as air and imparting at separate stages to the material about to be treated the heat thus extracted.

6. A method of economizing heat in the treatment of peat effected by raising its temperature under pressure sufficient to prevent evaporation, consisting in extracting heat from the product of the treatment by means of vapor generated upon a reduction of pressure, thereafter extracting heat of lower degree from said product by means of a circulating body of heat carrying matter such as air brought in direct contact therewith, extracting a further quantity of heat of still lower degree from liquid expressed from the treated material by means of a circulating body of heat carrying matter and imparting at separate stages to the material about to be treated the heat thus extracted.

7. A method of rendering the water of peat more freely expressible, consisting in heating the peat without evaporation thereof in order to destroy its water binding properties, expressing liquid from peat thus treated, and circulating a gas in contact with the resulting effluent and untreated peat in order to preheat the latter.

8. A method of economizing heat in the treatment of peat in tubular heating apparatus, through which it is continuously passed while being heated to destroy its water binding properties, consisting in dewatering the treated peat while hot, and circulating a gas between the warm effluent and untreated peat in order to preheat the latter.

9. A method of economizing heat in the treatment of peat in tubular heating apparatus through which it is continuously passed while being heated under pressure preventing ebullition in order to destroy its water binding properties, consisting in circulating gas in direct contact with the peat thus treated and peat about to be treated, in order to preheat the latter.

In testimony whereof I have signed my name to this specification in the presence of two subscribing witnesses.

T. RIGBY.

Witnesses:
 BERTRAM H. MATTHEWS,
 C. S. DEALTRY.